(12) United States Patent
Fakhari

(10) Patent No.: US 11,047,149 B1
(45) Date of Patent: Jun. 29, 2021

(54) FENCE SYSTEM INCLUDING FIBERGLASS T-POSTS

(71) Applicant: F & F Composite Group, Inc., Keller, TX (US)

(72) Inventor: M. John Fakhari, Fort Worth, TX (US)

(73) Assignee: F & F Composite Group, Inc., Keller, TX (US)

( * ) Notice: Subject to any disclaimer, the term of this patent is extended or adjusted under 35 U.S.C. 154(b) by 584 days.

(21) Appl. No.: 15/891,894

(22) Filed: Feb. 8, 2018

Related U.S. Application Data

(60) Provisional application No. 62/456,332, filed on Feb. 8, 2017.

(51) Int. Cl.
| | | |
|---|---|---|
| *E04H 17/20* | (2006.01) | |
| *E04H 17/26* | (2006.01) | |
| *B29C 70/02* | (2006.01) | |
| *B32B 27/30* | (2006.01) | |
| *E04H 12/22* | (2006.01) | |
| *E04H 17/14* | (2006.01) | |

(52) U.S. Cl.
CPC .......... *E04H 17/20* (2013.01); *B29C 70/023* (2013.01); *B32B 27/30* (2013.01); *E04H 12/2253* (2013.01); *E04H 17/1417* (2013.01); *E04H 17/1447* (2021.01); *E04H 17/263* (2013.01); *B32B 2323/04* (2013.01); *E04H 17/1473* (2021.01)

(58) Field of Classification Search
CPC .......... E04H 17/1421; E04H 17/1434; E04H 17/1443; E04H 17/20; E04H 2017/1447; E04H 2017/1452; E04H 2017/146

USPC .......................................... 256/65.02
See application file for complete search history.

(56) References Cited

U.S. PATENT DOCUMENTS

| | | | | |
|---|---|---|---|---|
| 4,007,919 A | * | 2/1977 | Totten ................... | E04H 17/168 256/59 |
| 4,684,108 A | * | 8/1987 | Bergagnini ......... | E04H 17/1443 256/73 |
| 6,173,945 B1 | * | 1/2001 | Lindsey .............. | E04H 17/1413 256/65.07 |
| 8,429,805 B1 | * | 4/2013 | Adkins ............... | E04H 17/1417 256/65.02 |
| 9,416,559 B2 | * | 8/2016 | Brechon ................. | E04H 17/20 |
| 9,518,404 B2 | * | 12/2016 | Volin ...................... | E04H 17/20 |

FOREIGN PATENT DOCUMENTS

| | | | | |
|---|---|---|---|---|
| DE | 4005160 A1 | * | 8/1991 | ......... E04H 17/1421 |
| EP | 1505226 A1 | * | 2/2005 | ............. E04H 17/20 |
| EP | 2365161 A1 | * | 9/2011 | ......... E04H 17/1434 |
| FR | 2102961 A5 | * | 4/1972 | ......... E04H 17/1413 |

OTHER PUBLICATIONS

Fiberfence Ranch Style Fence, Cattle Gates & Pens, F & F Composite Group, Inc.

\* cited by examiner

*Primary Examiner* — Josh Skroupa
(74) *Attorney, Agent, or Firm* — Erickson Kernell IP, LLC; Kent R. Erickson

(57) ABSTRACT

Fence assemblies are assembled from T-posts and cross-members which may comprise rails formed from C-channels. The T-posts and rails are formed from pultruded fiberglass and can be connected together using bolts and nuts or push rivets. Cross members comprising wires or pultruded, fiberglass tubes may also be used.

3 Claims, 4 Drawing Sheets

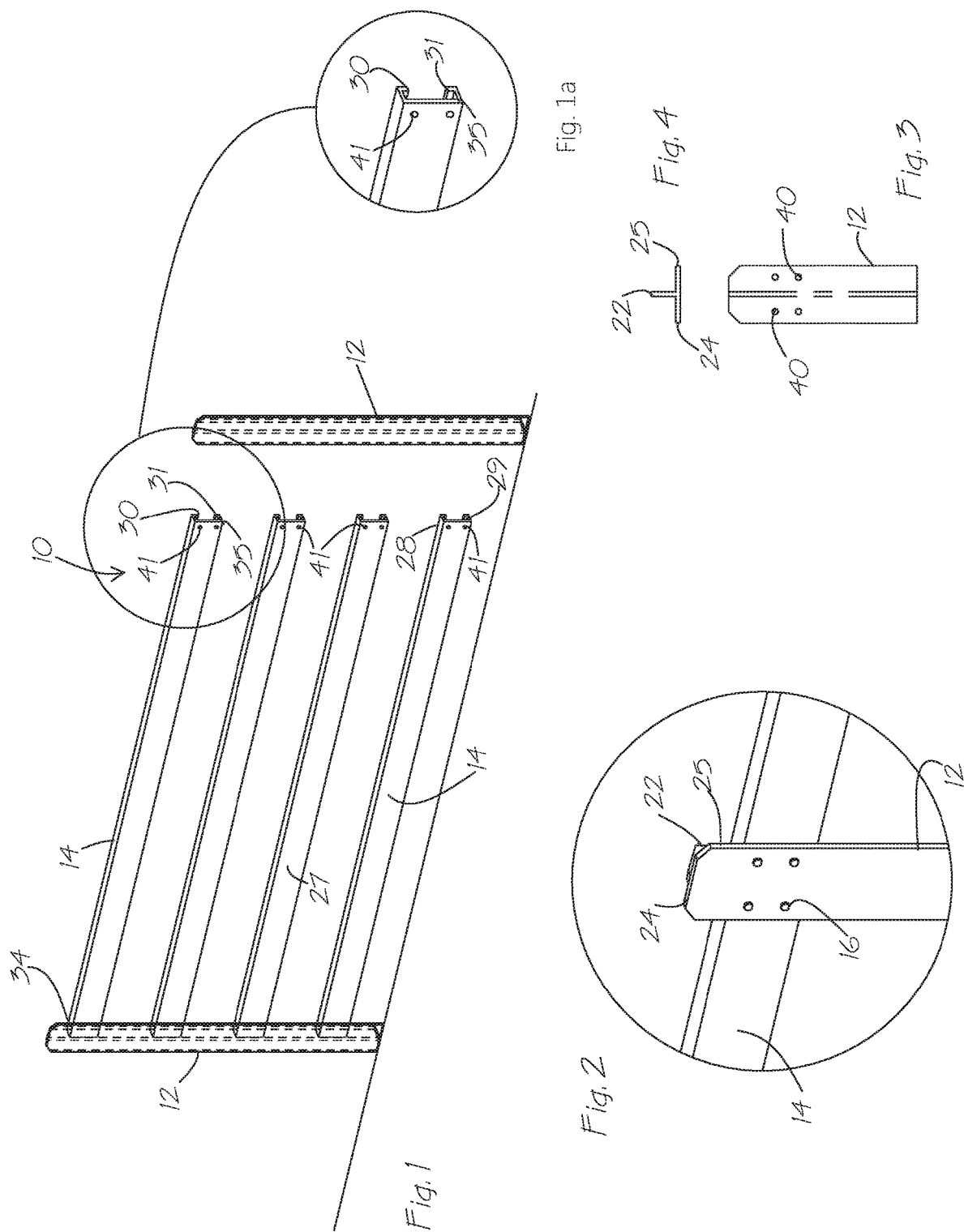

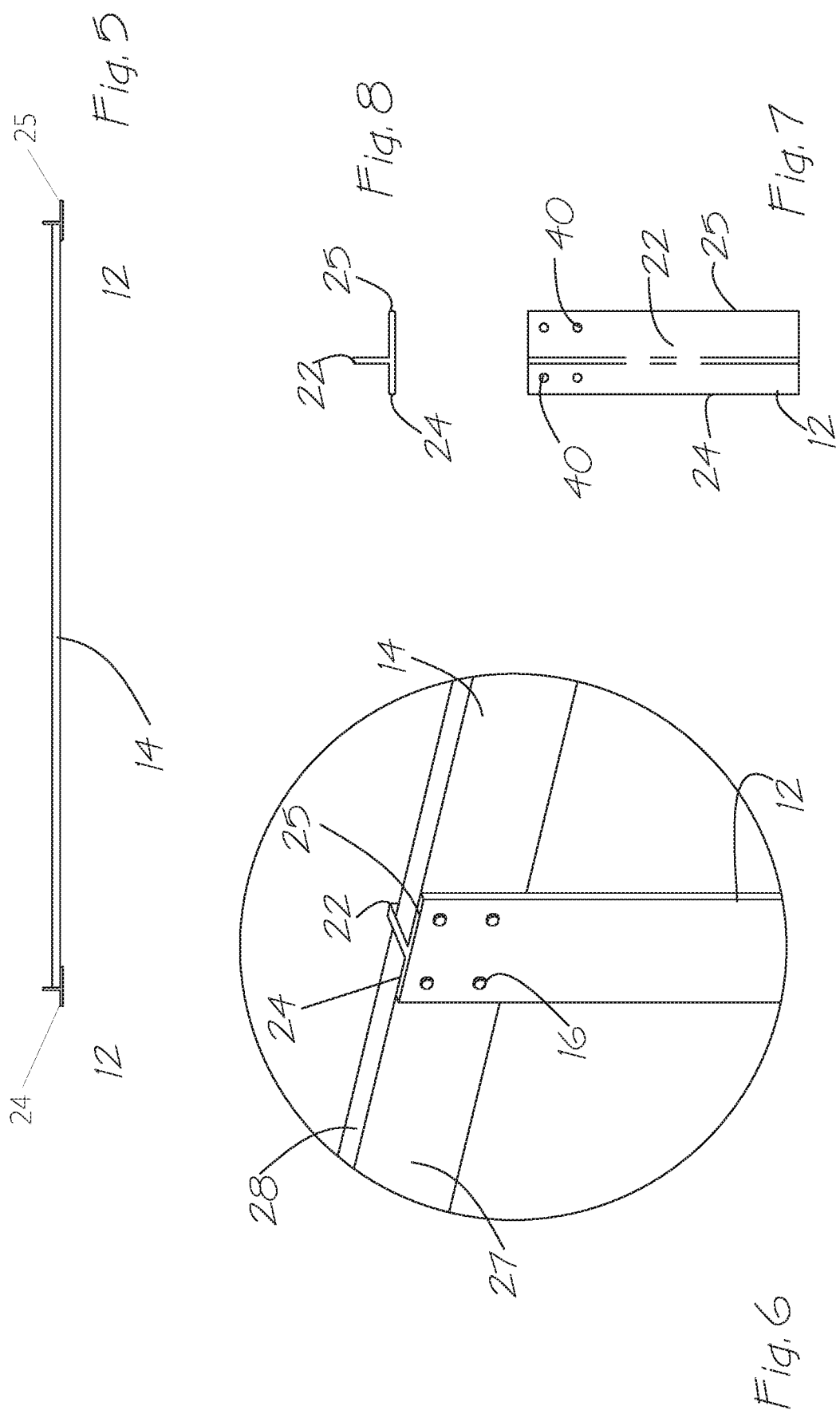

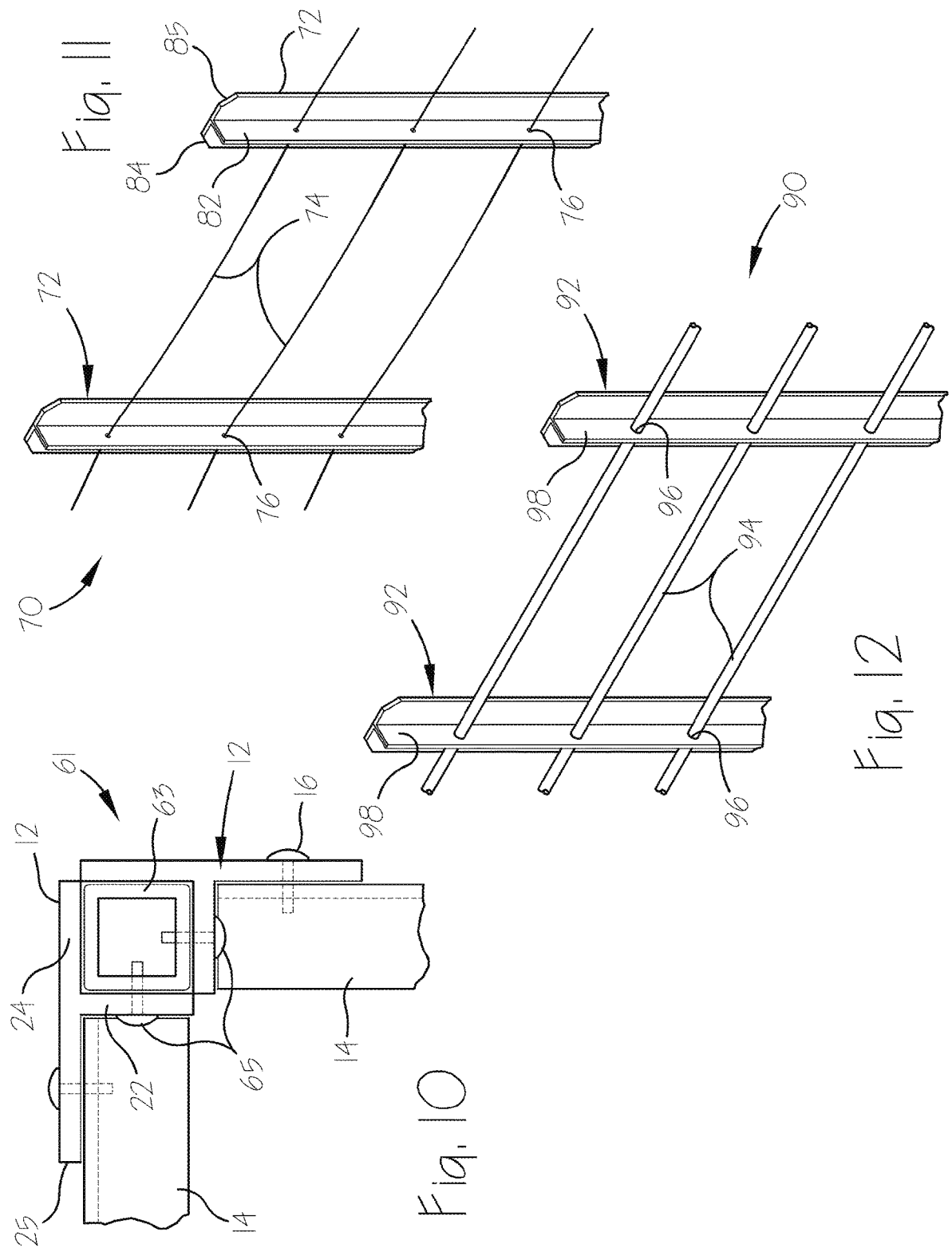

FENCE SYSTEM INCLUDING FIBERGLASS T-POSTS

CROSS-REFERENCE TO RELATED APPLICATIONS

This application is claims the benefit of U.S. Provisional Patent Application No. 62/456,332, filed Feb. 8, 2017, the disclosure of which is hereby incorporated herein in its entirety by reference.

BACKGROUND OF THE INVENTION

Field of the Invention

This invention relates to materials for constructing fences. More specifically, it relates to fencing components manufactured from weather resistant composite material.

Background & Description of the Related Art

Fencing to contain livestock must be sturdy. Conventional livestock fencing has been made of wood or metal. Metal fencing in the form of wire or mesh strung between vertical posts is a fairly common approach to constructing fences for livestock and may utilize metal T-posts across which the wire or mesh is strung. Wooden fences formed from horizontally extending plank type rails supported between posts are often used in areas where it is desired for the fence to present an ornamental appearance and for containing horses which are more prone to attempt to run through wire fencing. Both wood and metal offer strength and durability, but they have the significant drawback of corroding and deteriorating in harsh outdoor environments. Specifically, wood tends to rot and metal tends to rust when exposed to precipitation coupled with extreme temperatures. Fence manufacturers try to mitigate this issue by using paint to protect the underlying wood and metal structures, but inevitably water finds its way past the paint and deterioration ensues.

Fence posts and rails formed from plastic materials including vinyl and high density polyethylene have been developed. However, fences formed from these materials tend to be relatively difficult to assemble and may require additional reinforcing elements to provide sufficient strength to the completed fence. Composite materials, such as fiberglass, have been used to form the components of fences. Such composite materials have excellent strength and durability, and they do not have the deterioration issues of wood and metal. Existing ranch style fiberglass fencing systems have attempted to mimic the construction of wood or plastic fencing with square posts. Brackets are then bolted to the posts and then the rails are bolted to the brackets. Assembly of these types of fences is relatively time consuming.

There remains a need for rail type fencing components formed from relatively strong materials that do not rust or rot and which are configured to be relatively easy to assemble.

SUMMARY OF THE INVENTION

The present invention is directed to a fence assembly including cross members connected between T-posts which are formed from a composite material such as fiber reinforced polymer. The cross members may be rails, tubing or wire. The rails or tubing are also preferably formed form fiber reinforced polymer. For the fence assembly including rails connected to T-posts, the ends of the rails are connected to flanges on adjacent T-posts by fasteners extending through aligned holes in the flanges and the ends of the rails. The fasteners may comprise bolts and nuts or push type rivets. In one embodiment of the T-post, one of the flanges may be narrower than the other flange so that the stem is offset relative to the edges of the T-post.

BRIEF DESCRIPTION OF THE DRAWINGS

FIG. 1 is an exploded perspective view of a fence assembly including a plurality of rails connected to spaced apart T-posts.

FIG. 1a is an enlarged and fragmentary view of an end of one of the rails of FIG. 1 to show additional detail.

FIG. 2 is an enlarged and fragmentary perspective view showing the ends of two rails connected to a T-post.

FIG. 3 is a fragmentary, front elevational view of an upper end of one of the T-posts.

FIG. 4 is a top plan view of the T-post as shown in FIG. 3.

FIG. 5 is a top plan view of an alternative embodiment of the fence assembly utilizing T-posts having rail mounting flanges of different widths.

FIG. 6 is an enlarged and fragmentary perspective view showing the ends of two rails connected to the alternative embodiment of the T-post as shown in FIG. 5.

FIG. 7 is a fragmentary, front plan view of the T-post as shown in FIG. 6.

FIG. 8 is a top plan view of the T-post as shown in FIG. 7.

FIG. 10 is a top plan view of a corner assembly formed by securing two T-posts to a length of square tubing.

FIG. 11 is a fragmentary perspective view of an alternative embodiment of the fence assembly including a plurality of wires strung through composite T-posts.

FIG. 12 is a fragmentary perspective view of an alternative embodiment of the fence assembly including a plurality of tubes extending through aligned apertures in adjacent composite T-posts.

DETAILED DESCRIPTION OF THE PREFERRED EMBODIMENTS

Figure 9:
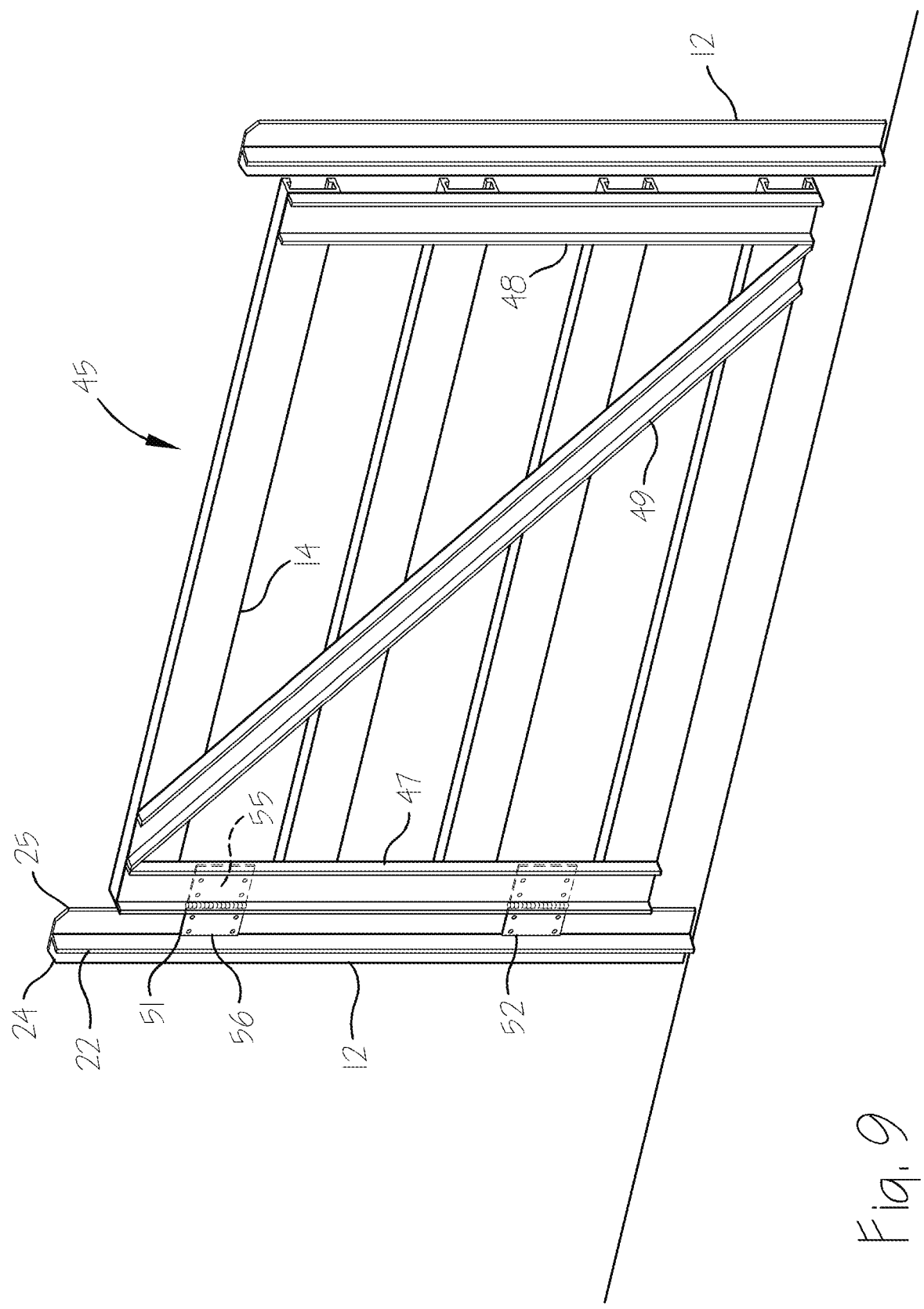
FIG. 9 is a perspective view of a gate assembly for mounting to a T-post using hinges.

Referring to the drawings in more detail, FIG. 1 shows a perspective view of fence or fence assembly 10. The fence assembly 10 comprises posts 12 and rails 14 and fasteners 16. A plurality of rails 14, four in the embodiment shown, extend horizontally in parallel spaced relation, between adjacent posts 12. The rails 14 are attached to the posts 12 using fasteners 16.

In the embodiment shown, the fence posts 12 and rails 14 are constructed of fiber reinforced polymer (FRP), which is occasionally referred to as fiberglass. FRP is a durable composite material comprising a polymer material, such as a thermoset resin, reinforced by glass, carbon, aramid or other types of fibers. FRP products are formed using a variety of manufacturing methods including a pultrusion process. Pultrusion involves pulling reinforcing fibers or matting through a vat of resin and then through a heated die where the resin undergoes polymerization encasing the fibers and forming the desired, uniform shape of the component.

Posts 12 are formed with a T-shape cross-section and may be referred to as T-posts 12 and include a stem or shank 22 with a pair of arms or flanges 24 and 25 projecting perpendicular to the stem 22 at a distal end thereof and in opposite directions. In the embodiment shown in FIGS. 1-4, the flanges 24 and 25 are of the same width. In the embodiment shown in FIGS. 5-8, one of the flanges, i.e. flange 24 is narrower than the other flange, i.e. flange 25. In one embodiment, in which the flanges 24 and 25 are of equal width, the flanges may be approximately 2¼ inch wide. In an embodiment in which the flanges 24 and 25 are of different widths, the narrower flange 24 may be approximately 2 inches wide and the wider flange 25 may be approximately 2½ inches wide.

In the embodiment shown, the rails 14 are formed as C-shaped channels with a relatively broad web or face 27 and legs 28 and 29 projecting perpendicular to the web 27 at outer edges thereof. Inwardly turned lips 30 and 31 may be formed on the distal end of the legs 28 and 29 respectively. The legs 28 and 29 and lips 30 and 31 provide rigidity to the rails 14.

The height of posts 12 will depend on how the fence 10 will be used, but a typical height is in the range of six to eight feet with two feet driven into the ground and approximately four to six feet extending above ground. The rails 14 extending between posts 12 are typically eight feet long and ten inches tall from leg 28 to leg 29. The stem 22 and flanges 24 and 25 of the T-posts 12 are preferably approximately ¼ to ⅜ of an inch thick. The T-shaped cross-section provides sufficient strength and rigidity to withstand wear and tear that may be caused by weather, animals, and machines such as mowers and trimmers. The thickness of the stem 22 and flanges 24 and 25 can be modified as necessary to provide additional durability based on the environment and use of fence 10. Corners of the upper ends of each post 12, may be beveled to present a dog eared appearance. It is foreseen that other shapes could also be formed in the upper end of each post 12.

Ends 34 and 35 of each rail 14 are positioned in overlapping relationship with flanges 24 and 25 of adjacent posts 12 and connected thereto with fasteners 38 inserted through aligned holes 40 and 41 in the flanges 24 and 25 and in the ends 34 and 35 of the rails 14. The fasteners 38 may be bolts and nuts or push rivets or other acceptable fasteners.

Generally two vertically aligned holes 41 are formed in each end 34 and 35 of each rail 14 and correspondingly spaced holes 40 are formed in the corresponding flange 24 and 25 of the respective posts 12. The holes 40 and 41 may be formed in conjunction with the manufacturing process or in the field during installation using a drill. In the embodiments shown, four rails 14 are fastened between adjacent posts in vertical spaced relation. The number of rails 14 and their spacing can be adjusted.

The ends 34 and 35 of each rail 14 are secured against the flanges 24 and 25 of adjacent posts 12 with the web 27 of the rail 14 positioned flush against an inner surface of the flanges 24 and 25 adjacent the stem 22 and the legs 28 and 29 of the rail projecting away from the flanges 24 and 25. The length of the legs 28 and 29 preferably is shorter than the length of the stem 22 of the post 12 so that the legs 28 and 29 do not extend past the stem 22 when the rails 14 are secured to the posts 12.

Referring to FIG. 9, a gate 45 can be formed by fastening horizontal rails 14 to two vertically oriented supports or stiles 47 and 48 and fastening a cross-brace 49 to the rails 14 so that it extends at an angle generally from near an upper corner, downward toward a lower corner of the gate 45. The gate 45 may be connected to a T-post 12 using hinges 51 and 52. One leaf 55 of each hinge may be connected to the style 47 on hinged sided of the gate 45 and the other leaf 56 connected to one of the flanges 24 of the T-post 12. The T-posts 12 used for the gate 45 preferably are the type shown in FIG. 5 with the wider flange 25 adapted for securing a leaf 56 of a hinge thereto to provide additional clearance for opening and closing of a gate 45 relative thereto. A latch (not shown) can be mounted on the flange 24 of the opposite T-post 12 to engage a latching member mounted on the side of the gate 45 opposite the hinges for holding the gate 45 closed.

FIG. 10 discloses a corner assembly 61 formed from two T-posts 12 of the type having a flange 24 that is narrower than flange 25 secured around a square tube 63 with fasteners 65. The T-posts 12 are oriented so that the narrower flanges 24 extend towards each other and are positioned against adjacent faces of the square tube 63. In one embodiment, the narrower flanges 24 of the T-posts are approximately 2 inches wide and the sides of the square tube 63 are 2 inches wide. Rails 14 are then connected by fasteners 16 to the wider flanges 25 of each T-post 12.

Referring to FIG. 11, an alternative fence assembly 70 is shown in which T-posts 72 are used to support strands of wire 74. T-posts 72 are constructed similar to T-posts 12 except that, in the embodiment shown, holes 76 for wire 74 are formed in the stem 82 of the T-post 12. Although not shown, the wire 74 could be inserted through the hole 76, then wrapped around the portion of the stem 82 extending outward the hole 76 and then back through the hole 76. It is foreseen that pairs of holes for the wires 74 could be formed in flanges 84 and 85 of the T-post 72, in horizontal alignment on opposite sides of the stem 82 with the wire 74 threaded through the horizontally aligned holes. Referring to FIG. 12, an alternative fence assembly 70 is shown in which T-posts 92 are used to support rigid tubing 94 extending through larger holes 96 in the stem 98 of the T-posts 92.

It is to be understood that while certain forms of the present invention have been illustrated and described herein, it is not to be limited to the specific forms or arrangement of parts described and shown.

Having thus described the invention, what is claimed as new and desired to be secured by Letters Patent is:

1. A fence assembly comprising:
   a plurality of T-posts formed from a fiber reinforced polymer and having a stem and first and second flanges projecting outward from the stem in opposite directions; and
   a plurality of cross members connected between adjacent T-posts; wherein said first flange is narrower than the second flange.

2. A fence assembly comprising:
   a plurality of T-posts formed from a fiber reinforced polymer and having a stem and first and second flanges projecting outward from the stem in opposite directions and wherein said first flange is narrower than the second flange; and
   a plurality of rails formed from fiber reinforced polymer, opposite ends of each rail are fastened to first and second flanges of adjacent T-posts respectively by fasteners extending through aligned holes in the first and second flanges and the opposite ends of each rail respectively.

3. A kit for constructing a fence comprising:
   a plurality of T-posts formed from a fiber reinforced polymer and having a stem and first and second flanges projecting outward from the stem in opposite directions, each of said flanges having a plurality of fastener receiving bores formed therein in vertically spaced relationship;

a plurality of rails formed from fiber reinforced polymer, opposite ends of each rail having at least one fastener receiving opening formed therein; and a plurality of fasteners, each fastener insertable through one of the fastener receiving openings in one of the plurality of rails and through an aligned fastener receiving bore formed in one of the flanges of the T-post for connecting the rail to the T-post;

wherein said first flange is narrower than the second flange.

\* \* \* \* \*